(12) United States Patent
Mancuso et al.

(10) Patent No.: US 12,500,543 B2
(45) Date of Patent: Dec. 16, 2025

(54) ACTIVE TEMPERATURE CONTROL FOR GENERATOR IN POWER TRAIN

(71) Applicant: GE Infrastructure Technology, LLC, Greenville, SC (US)

(72) Inventors: Benjamin Alber Mancuso, Glenville, NY (US); Chad Duncan Munkres, Ballston Lake, NY (US); Mateusz Wojciech Golebiowski, Ehrendingen (CH); Eric Paul Knopf, Würenlingen (CH); James Royce Howes, Hermon, ME (US); Daryl Rufus Collins, Simpsonville, SC (US); Jeffrey James Andritz, Saratoga Springs, NY (US); Eric Steven Buskirk, Scotia, NY (US); Peter John Eisenzopf, Altamont, NY (US)

(73) Assignee: GE INFRASTRUCTURE TECHNOLOGY, LLC, Greenville, SC (US)

( * ) Notice: Subject to any disclaimer, the term of this patent is extended or adjusted under 35 U.S.C. 154(b) by 189 days.

(21) Appl. No.: 18/405,340

(22) Filed: Jan. 5, 2024

(65) Prior Publication Data
US 2024/0421748 A1 Dec. 19, 2024

Related U.S. Application Data

(60) Provisional application No. 63/507,862, filed on Jun. 13, 2023.

(51) Int. Cl.
*H02P 29/68* (2016.01)

(52) U.S. Cl.
CPC .................................. *H02P 29/68* (2016.02)

(58) Field of Classification Search
CPC . B60K 2001/003; B60L 50/13; B60L 15/007; B60L 1/003; H02P 29/68;
(Continued)

(56) References Cited

U.S. PATENT DOCUMENTS 7,755,230 B2 7/2010 Nakahara et al.
9,819,300 B2 11/2017 Matsumoto et al.
(Continued)

FOREIGN PATENT DOCUMENTS

EP 2088410 A1 8/2009
EP 2605379 A1 6/2013
(Continued)

OTHER PUBLICATIONS

Santini, Marco et el., A Turbomachinery Plant Comprising a Mechanical Drive Hybrid Gas Turbine and a Dynamic Cooling System for the Mechanical Drive Hybrid Gas Turbine, Nov. 3, 2022, Clarivate Analytics, pp. 1-52. (Year: 2022).*
(Continued)

*Primary Examiner* — Antony M Paul
(74) *Attorney, Agent, or Firm* — James Pemrick; Charlotte Wilson; Hoffman Warnick LLC

(57) ABSTRACT

The disclosure provides an apparatus including a temperature sensor configured to monitor a temperature of a generator component of a power train assembly. The power train assembly includes a power train component in thermal communication with a cooling fluid and mounted on a same shaft as the generator component. A controller is coupled to the temperature sensor and a heat exchange circuit for adjusting a temperature of the cooling fluid. The controller calculates a target temperature for the generator component based on a target thrust bearing parameter or a target vibration parameter for the power train assembly and adjusts a delivery of the cooling fluid to the power train component (Continued)

based on a difference between the monitored temperature and the target temperature.

20 Claims, 15 Drawing Sheets

(58) Field of Classification Search
CPC .......... F01D 21/12; F01D 25/04; F01D 25/12; F01D 15/10; F01D 19/02; F01D 25/16
See application file for complete search history.

(56) References Cited

U.S. PATENT DOCUMENTS

| | | |
|---|---|---|
| 11,242,156 B2 | 2/2022 | Spierling |
| 2022/0235671 A1 | 7/2022 | Rambo |

FOREIGN PATENT DOCUMENTS

| | | | |
|---|---|---|---|
| JP | 2000350413 A | 12/2000 | |
| JP | 2011153209 A | 8/2011 | |
| JP | 2017033546 A | 2/2017 | |
| JP | 6574594 B2 | 9/2019 | |
| WO | WO-2022228724 A1 * | 11/2022 | .............. F02C 7/143 |

OTHER PUBLICATIONS

European Search Report for corresponding EP Application No. 24177438.9-1004 dated Nov. 22, 2024, 11 pages.

* cited by examiner

ACTIVE TEMPERATURE CONTROL FOR GENERATOR IN POWER TRAIN

FIELD OF THE DISCLOSURE

The subject matter disclosed herein relates to turbomachines. More particularly, the subject matter disclosed herein relates to apparatuses and methods for active temperature control for a generator in a power train.

BACKGROUND OF THE DISCLOSURE

Gas turbines, steam turbines, and generators are commonly used as part of a power train architecture in a power-generating plant. In one type of a power-generating plant, a gas turbine can be used in conjunction with a generator to generally form the power train for the plant. Within the power-generating plant, a compressor with rows of rotating blades and stationary vanes compresses air and directs it to a combustor that mixes the compressed air with fuel. In the combustor, the compressed air and fuel are burned to form combustion products (i.e., a hot air-fuel mixture), which are expanded through blades in a turbine.

Certain power trains having an electricity generator located between two turbines (often a gas turbine and steam turbine) may have a clutch to allow operation in simple and combined cycle modes. In this configuration, multiple thrust bearings (e.g., one for each turbine) and the clutch are structured to compensate for differential axial expansion or contraction of the shaft line between the thrust bearings, after the clutch engages. After the turbines start operating at steady state, any further expansion and contraction of the generator shaft (e.g., from ambient and plant cooling water temperature swings) can change the thrust load on the thrust bearing(s) if it occurs at less load than is required to compress or expand the clutch. Additionally, transient temperature swings can increase the number of slip events in the clutch. Generator shafts exposed to generator cooling medium and having a relatively long length may undergo, e.g., an approximately ten to twenty Celsius degree daily temperature swing producing an axial length change of approximately one to three millimeters or more. This situation may significantly affect the thrust bearing load, increasing wear and temperatures on the bearing(s). Additionally, this load and expansion can affect power train vibrations in the case where vibrations are especially high from correspondingly high axial clutch loads, relative to baseline operating characteristics.

BRIEF DESCRIPTION

All aspects, examples and features mentioned below can be combined in any technically possible way.

An aspect of the disclosure provides an apparatus including: a temperature sensor configured to monitor a temperature of a generator component of a power train assembly, wherein the power train assembly includes a power train component in thermal communication with a cooling fluid and mounted on a same shaft as the generator component; and a controller coupled to the temperature sensor and a heat exchange circuit for adjusting a temperature of the cooling fluid, wherein the controller is configured to: calculate a target temperature for the generator component based on a target thrust bearing parameter or a target vibration parameter for the power train assembly, and adjust a delivery of the cooling fluid to the power train component based on a difference between the monitored temperature and the target temperature.

Another aspect of the disclosure includes any of the preceding aspects, and wherein the controller is configured to adjust the delivery of the cooling fluid by increasing or reducing an amount of cooling fluid provided to or extracted from the generator component via a variable flow pump.

Another aspect of the disclosure includes any of the preceding aspects, and wherein the controller is configured to adjust the delivery of the cooling fluid by increasing or reducing an amount of cooling fluid transmitted from a return conduit to an entry conduit via a variable flow valve.

Another aspect of the disclosure includes any of the preceding aspects, and wherein the controller is configured to adjust the delivery of the cooling fluid by adjusting a mixing valve for diverting a portion of the cooling fluid exiting the heat exchange circuit into the generator component.

Another aspect of the disclosure includes any of the preceding aspects, and wherein the controller is configured to adjust the delivery of the cooling fluid by adjusting a temperature of a wet surface cooler within the heat exchange circuit.

Another aspect of the disclosure includes any of the preceding aspects, and wherein the controller is configured to adjust the delivery of the cooling fluid via an auxiliary heat exchanger within the heat exchange circuit.

Another aspect of the disclosure includes any of the preceding aspects, and wherein the controller is further configured to calculate the target temperature based on a target axial length or a target thermal expansion of the shaft.

An aspect of the disclosure provides a system including: a power train assembly having a generator component and a power train component mounted on a same shaft; a temperature sensor configured to monitor a temperature of the generator component; a heat exchange circuit in thermal communication with the generator component, wherein the heat exchange circuit is configured to cool the generator component with a cooling fluid; and a controller coupled to the temperature sensor and the heat exchange circuit, wherein the controller is configured to: calculate a target temperature for the generator component based on a target thrust bearing parameter or a target vibration parameter for the power train assembly, and adjust a delivery of the cooling fluid to the power train component based on a difference between the monitored temperature and the target temperature.

Another aspect of the disclosure includes any of the preceding aspects, and wherein the controller is configured to adjust the delivery of the cooling fluid by increasing or reducing an amount of cooling fluid provided to or extracted from the generator component via a variable flow pump.

Another aspect of the disclosure includes any of the preceding aspects, and wherein the controller is configured to adjust the delivery of the cooling fluid by increasing or reducing an amount of cooling fluid transmitted from a return conduit to an entry conduit via a variable flow valve.

Another aspect of the disclosure includes any of the preceding aspects, and wherein the controller is configured to adjust the delivery of the cooling fluid by adjusting a mixing valve for diverting a portion of the cooling fluid exiting the heat exchange circuit into the generator component.

Another aspect of the disclosure includes any of the preceding aspects, and wherein the controller is configured to adjust the delivery of the cooling fluid by adjusting a temperature of a wet surface cooler within the heat exchange circuit.

Another aspect of the disclosure includes any of the preceding aspects, and wherein the controller is configured to adjust the delivery of the cooling fluid via an auxiliary heat exchanger within the heat exchange circuit.

Another aspect of the disclosure includes any of the preceding aspects, and wherein the controller is further configured to calculate the target temperature based on a target axial length or a target thermal expansion of the shaft.

An aspect of the disclosure provides a method including: monitoring a temperature of a generator component of a power train assembly, wherein the power train assembly includes a power train component in thermal communication with a cooling fluid of a heat exchange circuit and mounted on a same shaft as the generator component; calculating a target temperature for the generator component based on a target thrust bearing parameter or a target vibration parameter for the power train assembly; and adjusting a delivery of the cooling fluid to the power train component based on a difference between the monitored temperature and the target temperature.

Another aspect of the disclosure includes any of the preceding aspects, and wherein adjusting the delivery of the cooling fluid includes increasing or reducing an amount of cooling fluid provided to or extracted from the generator component via a variable flow pump.

Another aspect of the disclosure includes any of the preceding aspects, and wherein adjusting the delivery of the cooling fluid includes reducing an amount of cooling fluid transmitted from a return conduit to an entry conduit via a variable flow valve.

Another aspect of the disclosure includes any of the preceding aspects, and wherein adjusting the delivery of the cooling fluid includes adjusting a mixing valve for diverting a portion of the cooling fluid exiting the heat exchange circuit into the generator component.

Another aspect of the disclosure includes any of the preceding aspects, and wherein adjusting the delivery of the cooling fluid includes adjusting a temperature of the cooling fluid via a wet surface cooler or an auxiliary heat exchanger within the heat exchange circuit.

Another aspect of the disclosure includes any of the preceding aspects, and wherein the calculating of the target temperature is based on a target axial length or a target thermal expansion of the shaft.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
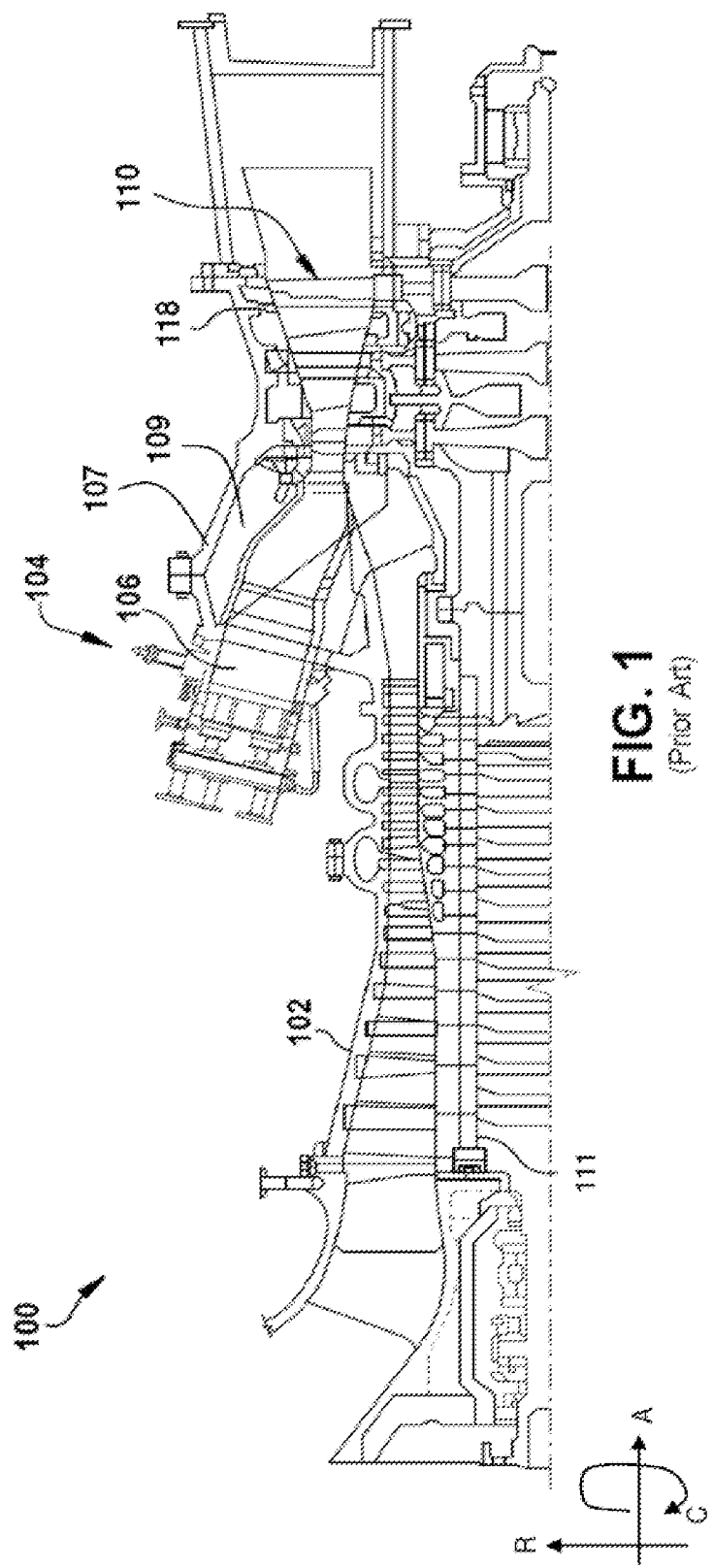
FIG. 1 shows a cross-sectional view of a conventional gas turbine (GT) engine for a power train assembly.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring to the drawings, FIG. 1 is a cross-sectional view of an illustrative machine including a turbomachine operable for use in a power train assembly where teachings of the disclosure can be applied. In FIG. 1, a turbomachine in the form of a combustion turbine or gas turbine (GT) engine 100 (hereinafter, "GT engine 100") is shown. GT engine 100 includes a compressor 102 and one or more combustors 104 disposed with a compressor discharge casing 107, which defines a plenum 109 that receives compressed air from compressor 102. Fuel nozzle(s) within combustor 104 supply fuel and air to a combustion chamber 106 to produce high temperature and high pressure combustion gases. GT engine 100 also includes a GT turbine 110 (i.e., an expansion turbine or turbine section) and a common compressor/turbine shaft 111 (hereinafter referred to as "rotor 111").

In one embodiment, GT engine 100 may include a presently commercially available from GE Vernova of Cambridge, MA. The present disclosure is not limited to any one particular GT system and may be implanted in connection with other engines including, for example, the other HA, F, B, LM, GT, TM and E-class engine models of GE Vernova, and engine models of other companies. Furthermore, the present disclosure is not limited to any particular turbomachine, and may be applicable to, for example, steam turbines, jet engines, compressors, turbofans, etc. More importantly, the teachings of the disclosure are not necessarily applicable to only a turbine assembly in a GT engine and may be applied to practically any type of industrial machine or other turbine operable to mechanically drive a generator as discussed herein. Hence, references to GT engine 100 and, specifically, to GT turbine 110 of GT engine 100 are merely for descriptive purposes and are not limiting.

Figure 2:
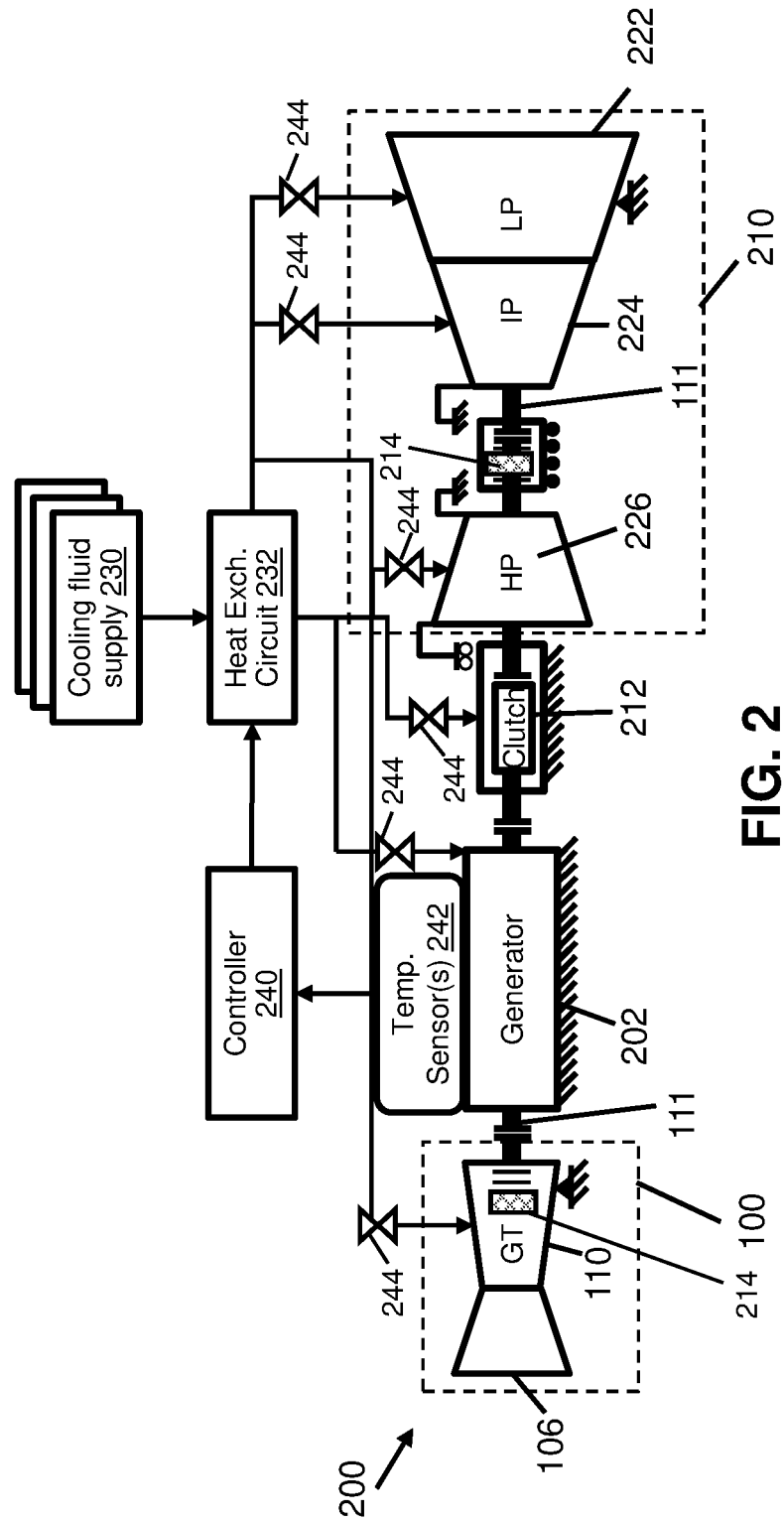
FIG. 2 shows a schematic diagram of a power train assembly and interconnected components of an apparatus according to embodiments of the disclosure.

Referring to FIGS. 1 and 2, and as described herein, embodiments of the disclosure provide a power train assembly (simply "assembly" hereafter) 200 with a generator 202 mounted on shaft 111. Any subcomponents, sub-systems, and/or other parts of generator 202 such as windings, generator shaft sections, stator sections, etc., may be known individually or collectively as "generator components." Assembly 200, as discussed herein, includes various power train components mounted on shaft 111 together with generator 202, and each of these components may be in thermal communication with one or more cooling fluids. Generator 202 is located between two turbines, e.g., GT turbine 110 of GT engine 100 and a steam turbine 210, though other arrangements are possible. Assembly 200 may include a clutch 212 between generator 202 and one turbine (e.g., steam turbine 210) to allow operation in simple (i.e., only one turbine operates) and combined cycle (i.e., both turbines operate) modes. In this configuration, assembly 200 includes multiple thrust bearings 214 and clutch 212 to compensate for differential axial expansion or contraction of shaft 111 between thrust bearings 214 after clutch 212 is mechanically engaged. Clutch 212 may accommodate axial length changes of shaft 111, e.g., by acting as a splined-type gear coupling in addition to a selectively engageable clutch. Any sliding of clutch 212, in this case, may occur via torque transmission teeth (not shown) within clutch 212. Generator 202 itself may be considered to be a "power train component" in various embodiments of the disclosure, but other power train components may include any of the various operating components shown in FIG. 2 and/or other FIGS., and thus may include any device included within and/or coupled to assembly 200.

When turbines 110, 210 of assembly 200 begin to operate at steady state, any further expansion and contraction of shaft 111 (e.g., from ambient and plant cooling water temperature swings) can change the thrust load on thrust bearing(s) 214, particularly in the case where this change occurs at less than the sliding coefficient of friction of clutch 212. Additionally, transient temperature swings within assembly 200 may be associated with undesirable slipping of clutch 212. Shafts 111 exposed to generator cooling media and having a relatively long length may undergo, e.g., an approximately ten to twenty Celsius degree daily temperature swing producing an axial length change of approximately one to three millimeters or more. This situation may significantly increase the thrust bearing load(s) on various components of assembly 200, increasing wear and temperatures on bearing(s) 214. Additionally, this load and expansion can affect power train vibrations in the case where vibrations are especially high from unusually large axial clutch loads.

In addition to the generator shaft axial length, the length of shaft 111 in assembly 200 may vary as a result of other variables, including but not limited to: lubricant oil temperature, ambient air temperature, collector housing air temperature, steam path temperature, steam sealing temperature, turbine compressor temperatures, etc. These fluctuations and oscillations can lead to increased thrust bearing load, particularly in assemblies 200 operating with only one shaft 111. Additionally, these variables may affect equipment behavior in ways that make operation less consistent and less predictable. Using one parameter to offset changes in another significantly reduces cycling and may produce excess load on certain parts of assembly 200. Additionally, assemblies 200 having certain component-coolant combinations (e.g., air cooled condensers) may experience larger cooling fluid temperature changes elsewhere, driving larger daily variation in gas temperatures within generator 202. Examples of thermal variation and mechanical force(s) experienced by assembly 200 are shown in detail in FIG. 3 and will be described further herein.

As discussed herein, various components within assembly 200 may be cooled to control thrust, vibrations, and/or other operational characteristics of assembly 200. Assembly 200 may include steam turbine 210 on shaft 111, and various subcomponents of steam turbine 210 may be cooled independently and/or in combination. Steam turbine 210, in the depiction shown, may include a low pressure (LP) component 222, an intermediate pressure (IP) component 224 and a high pressure (HP) component 226, as is known in the art. LP component 222, IP component 224 and HP 226 of steam turbine may all be coupled and/or positioned on and/or may be configured to rotate shaft 111 to produce mechanical work and/or to drive generator 202 and/or other components. Certain components of steam turbine 210, e.g., HP component 226 and IP component 224, may be mechanically intercoupled through thrust bearing(s) 214. Thrust bearing(s) 214 may be specifically configured to support varying axial loads within steam turbine 210 under varying conditions and thrust bearing(s) 214 may intercouple other components of assembly 200 other than HP component 226 and IP component 224. GT turbine 110 of GT engine 100 similarly may be mechanically coupled to generator 202 on shaft 111 through thrust bearing(s) 214.

In assembly 200, any of GT engine 100, generator 202, clutch 212, and/or steam turbine 210 may be cooled through various types of cooling infrastructure. These cooling mechanisms may rely on one or more cooling fluid supplies 230 coupled to a heat exchange circuit 232 which provides a flow of a cooling fluid (e.g., air, hydrogen, water, etc.) to cool components and/or sections thereof. At least some of the heat generated by operating losses is removed by cooling circuit components in heat exchange circuit 232 that are fed by a cooling fluid (e.g., air, water, glycol, and/or other cooling fluids originating from another cooling fluid supply 230). Heat exchange circuit 232 also may include other coolant transmitting/returning infrastructure that uses and/or may be fed directly from cooling water for assembly 200 and/or may rely upon liquid-to-liquid heat exchangers (or other heat exchange systems) cooled by plant cooling water. Thus, cooling fluid supply(ies) 230 may indicate multiple cooling supplies having similar or different cooling fluids, and/or similar or different temperatures when supplied. Thus, heat exchange circuit 232 may use a first coolant for directly cooling a particular component, a second coolant for absorbing heat from the first coolant (i.e., via cooling liquid loop), and/or any other combination of coolants and/or coolant temperatures.

The heat exchange circuit of conventional power trains may be configured to operate only at full capacity, providing a continuous unregulated flow of coolant(s) to keep any cooled components at the lowest possible temperature. In conventional systems, the temperature of cooling fluid transmitted to the generator also may depend on plant cooling water and/or ambient coolant temperatures. Embodiments of the disclosure differ from conventional heat management infrastructure by using coolant(s) to actively control any axial thermal expansion of contraction shaft 111 during steady state operation that may further improve mechanical performance. That is, embodiments of assembly 200 use heat exchange circuit 232 in combination with a controller 240 and/or other hardware to control shaft 111 expansion, thrust, etc., by adjusting the amount of cooling fluid(s) provided from cooling fluid supply(ies) 230. By accounting for thrust bearing and/or vibration parameters in power train assembly 200, embodiments of the disclosure enable a more consistent output at steady state operation. Furthermore, controller 240 may select and/or modify the target temperature of generator 202 to meet certain performance objectives when accounting for thrust bearing 214 parameters (e.g., thrust load), shaft 111 vibrations, etc. Embodiments of the disclosure, in some cases, may control cooling of power train assembly 200 such that shaft 111 has a steady, unchanging temperature and does not undergo any significant thermal expansion or contraction cycles as its operation continues. In other cases, the target temperature(s) for various parts of power train assembly 200 may change over time, e.g., by being manually selected by the operator, automatically determined controller 240 to account for other system changes (e.g., lubricant oil conditions, steam temperature, air temperature, gas turbine thrust load, steam turbine thrust load, vibration, etc.), and/or combinations of these approaches.

Figure 3:
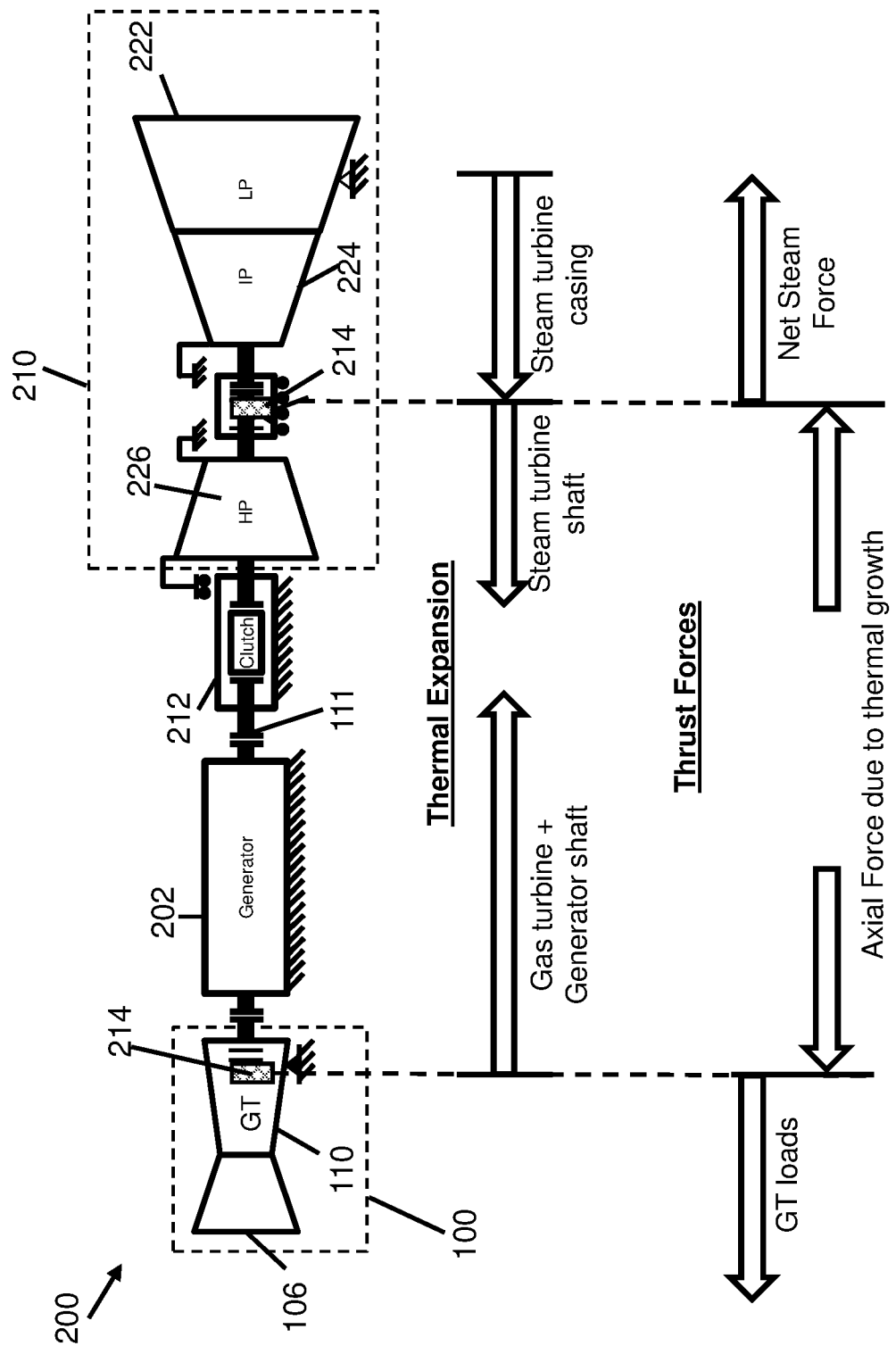
FIG. 3 shows a schematic diagram of thermal growth and thrust forces acting on a power train assembly and monitored by embodiments of the disclosure during operation.

FIG. 3 provides an annotated diagram of how thermal expansion and compression may affect thrust forces or other mechanical characteristics of assembly 200 during operation. Changing loads, operating modes, etc., may affect the temperature of various components within assembly 200, particularly thrust bearings 214. The effect of changing temperatures on each thrust bearing 214 may depend on where each thrust bearing 214 is located in assembly 200. The non-limiting diagram in FIG. 3 depicts the example of rising temperatures, which cause thermal expansion of metallic components at thrust bearing(s) 214 within assembly 200. Rising temperatures may cause inward axial expansion of GT engine 100 components as well as inward expansion of shaft 111 on which GT engine 100 is mounted. Similarly, rising temperatures may cause inward axial expansion of shaft 111 within steam turbine 210 and inward axial expansion of the casing for housing steam turbine 210. Inward axial expansion of shaft 111 and/or other components will affect the thrust forces against thrust bearings 214, i.e., due to reactive forces on thrust bearings 214 as shaft 111 and/or other components expand inward. Each thrust bearing 214 may experience outward axial forces in the opposite direction of thermal growth. These axial forces, during operation, are added to any existing thrust forces caused by aerodynamic loads within GT engine 100 ("GT loads") and steam force(s) produced in steam turbine 210. Embodiments of the disclosure actively control the temperature within assembly 200 to account for these combined thrust forces, whereas conventional systems may not account for any additional thrust forces produced from thermal expansion or compression.

Referring again to FIG. 2, embodiments of assembly 200 include a temperature sensor 242 (e.g., a thermometer, thermocouple, and/or any other currently known or later developed temperature sensing device) for monitoring temperatures within generator 202 at one or more locations. As the power train operates, temperature sensor 242 monitors the temperature of one or more generator 202 components, e.g., a portion or entirety of electricity generating components of the generator, a portion of the shaft on which the generator is mounted, stator windings, and/or any other portion of generator 202 where temperature may be measured.

Controller 240 may interact with heat exchange circuit 232 by way of flow regulators 244 (e.g., valves, pumps, and/or devices for controlling fluid flow described herein) to affect the amount of cooling fluid(s) provided to assembly 200. Controller 240 may include a computing device and/or any other currently known or later developed control system and may be coupled to temperature sensor 242 by wireless and/or wired connections to receive data therefrom. Controller 240 also may be coupled to various portions of heat exchange circuit 232, including flow regulators 244 therein. Flow regulators 244, as discussed herein, may include various configurations of valves, pumps, wet surface coolers, chiller assemblies, and/or any other currently known or later developed instrument(s) for controlling the temperature of fluid(s) heat exchange circuit 232 by adjusting the flow rate, ratio of composition, and/or other operating parameters of fluids therein.

Generator 202 may be coupled to, or otherwise include and/or be structurally integrated with, temperature sensors 242 at the outlet of its coolers, in a chamber that is at a slightly cooler outlet temperature, and/or other locations. The temperature(s) of generator 202, monitored via temperature sensors 242, may be transmitted to controller 240 via plant control software, and thus controller 240 may adjust flow regulator(s) 244 in reference to generator 202 temperatures and mechanical characteristics of shaft 111. As compared to control systems which may directly monitor various mechanical characteristics of shaft 111, the temperatures obtained from temperature sensor(s) 242 may be used to indirectly identify thrust bearing parameters, vibrations, and/or other characteristics of shaft 111. Controller 240, during operation, provides control logic for calculating target temperatures to achieve desired shaft 111 characteristics (e.g., target axial length, thermal expansion, etc., of thrust bearing(s) 214 reaching a set upper temperature limit (or axial load). The controller, in response, will adjust an amount of cooling fluid provided to various portions of assembly 200 to affect these shaft 111 indirectly via the temperature of assembly 200.

Figure 4:
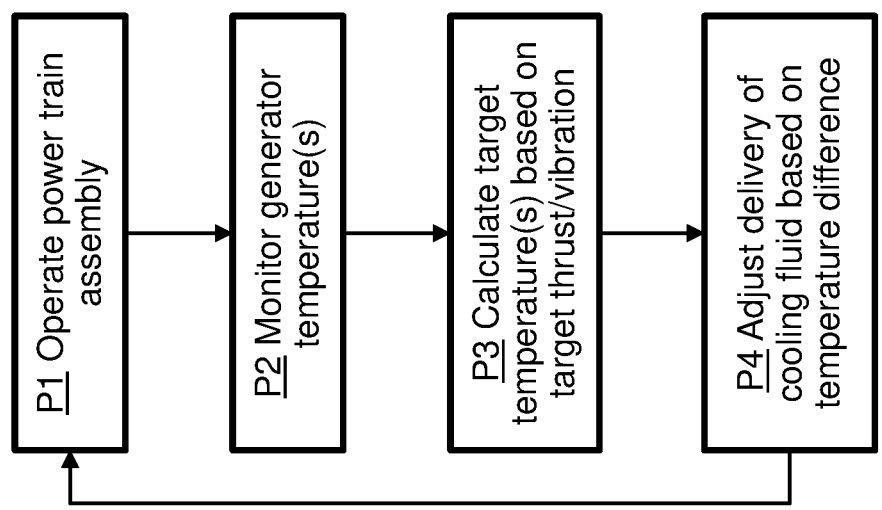
FIG. 4 shows an illustrative flow diagram with an operational methodology according to embodiments of the disclosure.

Referring now to FIGS. 2 and 4, FIG. 4 provides a flow diagram illustrating an example methodology which may be implemented via embodiments of assembly 200 (FIG. 2). Process P1 of the disclosure may include operating assembly 200, such that GT engine 100 and steam turbine 210 together drive generator 202 via shaft 111. As assembly 200 continues operating in process P1, the temperature within assembly 200 (and hence the temperature of thrust bearings 214) may vary due to changing loads, environmental conditions, and/or mechanical condition of parts, etc. To account for changing thrust loads on thrust bearings 214, and/or other variables such as the vibration of components within assembly 200, process P2 may include monitoring the temperature of generator 202 via temperature sensors 242. Temperature sensors 242 may be positioned in a variety of locations within generator 202 as discussed herein, and any one or more of temperature sensors 242 may be included in (or excluded from) monitoring of generator 202 temperatures in process P2.

In process P3, controller 240 may calculate target temperatures for any component of assembly 200 based on one or more of a desired amount of axial thrust to be imposed on thrust bearings 214, a desired amount of mechanical vibrations within assembly 200, etc. The calculating in process P3 may derive desired temperature(s) within generator 202 from known, measured, or estimated thermal expansions in any portion of assembly 200. Thermal expansion may be measured using, e.g., a total or partial length of shaft 111, a temperature of shaft 111 within generator 202, an amount of force imparted against clutch 212 and/or thrust bearing(s) 214, and/or other measurable variables indicating the characteristics of shaft 111 during operation. Vibratory parameters of assembly 200 may include, e.g., speed, acceleration, vibratory frequency, and/or other measurable properties of assembly 200 and/or its components. Vibratory parameters of assembly 200 may be measured via accelerometers and/or other sensors within assembly 200 or coupled to controller 240. In more sophisticated calculations, controller 240 may include logic and/or further variables to account for related quantities (e.g., loading of GT engine 100, net steam force from steam turbine 210, whether assembly 200 is in a steady state or transient operating mode, lubricant oil conditions, steam temperature, air temperature, gas turbine thrust load, steam turbine thrust load, vibration, etc.), thus increasing or decreasing the calculated target temperature based on current or estimated values for such quantities. In some cases, calculating the target temperature in process P3 may include independently modifying the calculated target temperature (e.g., manually or via additional computing devices in communication with controller 240) to further account for thermal expansion and/or stresses on the shaft or properties of other mechanical components of the power train assembly. In process P4, controller 240 may adjust the flow of cooling fluid(s) through heat exchange circuit 232 (e.g., by adjusting the position of one or more flow regulators) based on the difference between temperatures monitored via temperature sensor(s) 242 and the desired value of these temperatures calculated in process P3. The adjusting of cooling flow in process P4 can thus raise or lower the temperature(s) within generator 202 by controlling the amount of cooling fluid(s) in generator 202, thus affecting thrust on thrust bearing(s) 214 and/or vibrating of other components of assembly 200.

As discussed herein, controller 240 may include any of a variety of mathematical formulas, simulated models, look-up tables, etc., for calculating the target temperature(s) in process P3. For instance, the controller may calculate the target temperature based on a target thrust bearing load on thrust bearing(s) 214 in one or more selected positions of the power train assembly (e.g., those for sustaining a thrust bearing load for one or more particular load cells in GT engine 100). Further operating characteristics that controller 240 used to calculate the target temperature(s) may include the temperature of components outside generator 202 (e.g., thrust bearing 214 temperatures, temperatures within GT engine 100 and/or steam turbine 210, etc.) and/or other quantities from which a temperature or thermal expansion within assembly 200 may be derived.

Referring to various implementations shown in FIGS. 5-15, various types of heat exchange circuits 232 may interact or couple with assembly 200 and controller 240 for active temperature control within assembly 200. The embodiments of assembly 200 shown in FIGS. 5-15 may include heat exchange circuit(s) 232 with multiple cooling fluids, e.g., various combinations of plant cooling water, ambient air, river water, etc., in which a first line 252 transmitting a first (sealed) cooling fluid absorbs heat from generator 202 and a second line 256 transmits a second (non-sealed) cooling fluid provided from cooling fluid supply 230 for absorbing heat from the first cooling fluid. However, it is understood that embodiments of the disclosure are also applicable to assemblies 200 having only one cooling fluid, and/or those having three or more cooling fluids through adding or removing sub-circuits within heat exchange circuit 232 for the additional cooling fluid(s).

Figure 5:
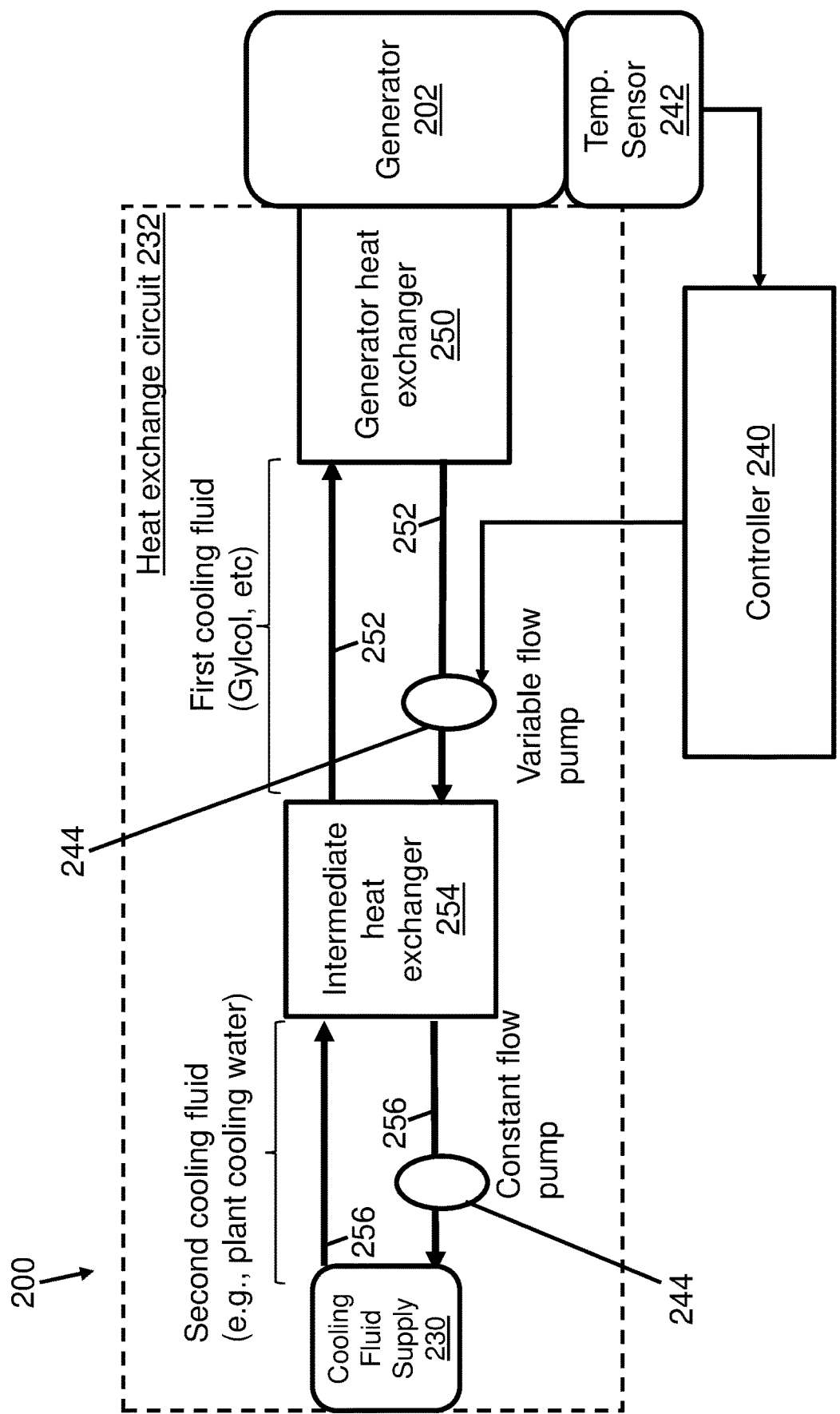
FIGS. 5-15 show block diagrams of active temperature control hardware for cooling fluids in a power train according to various embodiments of the disclosure.

FIG. 5 depicts an example in which heat exchange circuit 232 of assembly 200 includes a generator heat exchanger 250 and a set of first coolant transmission lines ("first lines") 252 for transmitting a first cooling fluid (e.g., a sealed coolant such as glycol, hydrogen, etc.) between generator heat exchanger 250 and an intermediate heat exchanger 254. In further examples, first line 252 may be coupled to other heat exchangers (not shown) for power train components other than generator 202. Within generator heat exchanger 250, the first cooling fluid is in thermal communication with generator 202 and absorbs heat therefrom. First lines 252 circulate the first cooling fluid to intermediate heat exchanger 254 where the first cooling fluid exchanges heat with a second (non-sealed) cooling fluid (e.g., plant cooling water, air, ambient fluid(s), and/or other examples discussed herein). A set of second coolant transmission lines ("second lines 256") transmit the second cooling fluid(s) from cooling fluid supply 230 to intermediate heat exchanger 254 and vice versa. One or more flow regulators 244 (e.g., a "variable flow pump," or alternatively a valve or other controllable flow mechanism(s)) may be operably coupled to controller 240, enabling active flow control of the first cooling fluid(s) within first line(s) 252. By increasing the flow through flow regulator 244, generator heat exchanger 250 may absorb more heat from generator 202. By decreasing the flow through flow regulator 244, generator heat exchanger 250 may absorb less heat from generator 202. The first cooling fluid(s) is/are kept at a desired low temperature by transferring heat to second cooling fluid(s) when passing through intermediate heat exchanger 254. The first cooling fluid absorbs heat from generator 202 and in turn transfers the absorbed heat to the second cooling fluid via intermediate heat exchanger 254. Second line 256 itself also may include a flow regulator 244 for controlling a flow of second cooling fluid(s) therethrough.

In the example of FIG. 5, flow regulator 244 includes a "constant flow pump" for maintaining a single continuous flow rate between cooling fluid supply 230 and intermediate heat exchanger 254. Flow regulator 244 of second line 256 thus do not necessarily need not be coupled to controller 240. In further implementations, all flow regulators 244 of assembly 200 may be coupled to controller 240. Here, flow regulator 244 maintains a constant flow of the second cooling fluid within second line 256 while flow regulator 244 permits variable flow control over the first cooling fluid within first line 252. Thus, flow regulator 244 within first line 252 controls the amount of heat exchange between the first cooling fluid and the second cooling fluid. As discussed herein, controller 240 may monitor temperature(s) within generator 202, calculate a target temperature for generator 202 based on a target thrust bearing parameter or a target vibration parameter for assembly 200, and adjust a delivery of the cooling fluid(s) to generator heat exchanger 250 via flow regulator(s) 244 based on a difference between the monitored temperature(s) within generator 202 and their targeted value(s). In further implementations discussed herein, other types of flow regulators 244 (e.g., pressure/flow control valving) and/or additional cooling components may be used to control the flow rate of cooling fluid(s) in thermal communication with the generator 202, thus adjusting the temperature within generator 202 to affect thermal expansion, vibration parameter(s), and/or related variables such as mechanical stresses.

Figure 6:
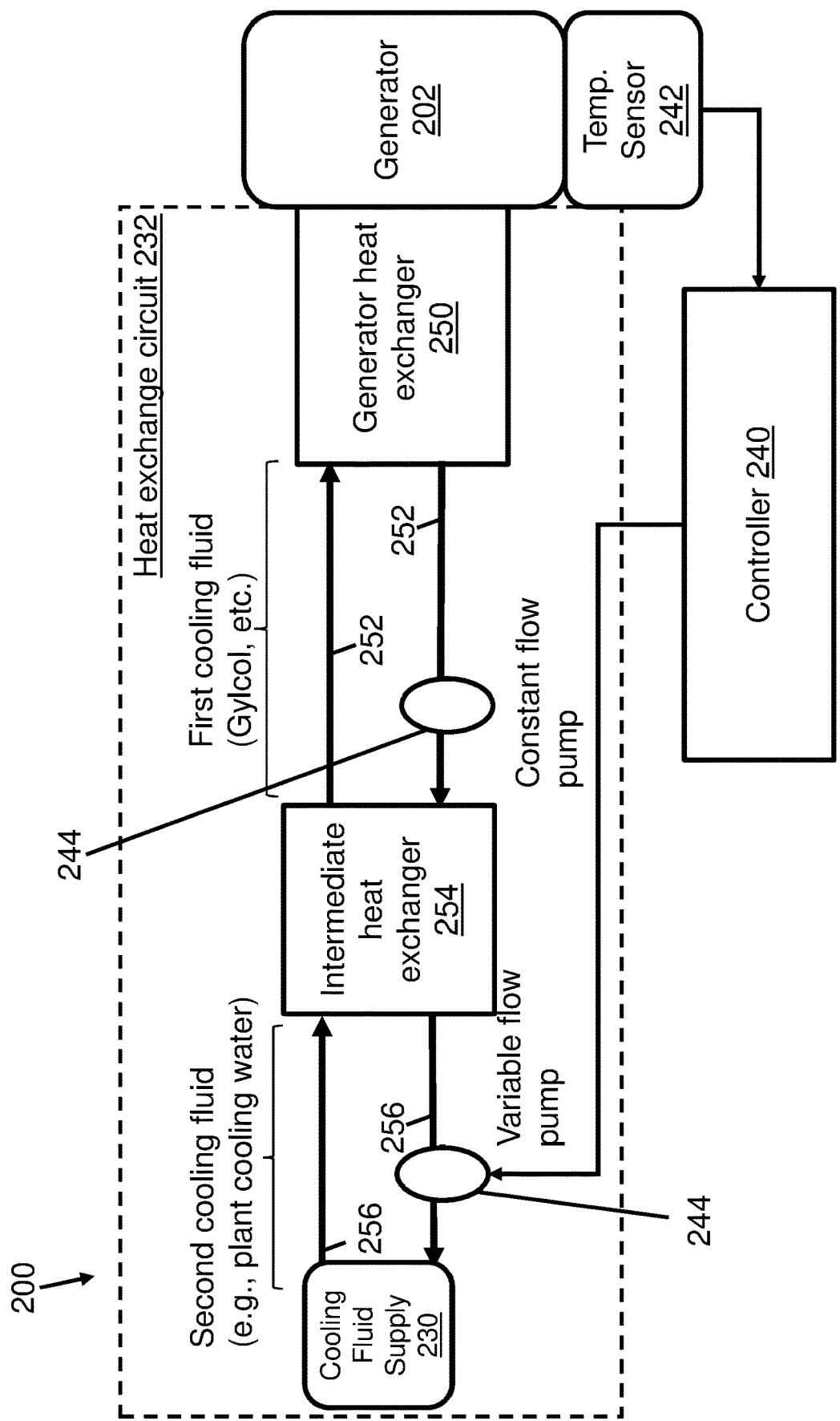

FIG. 6 depicts a further example of assembly 200, in which the second cooling fluid within second line 256 is circulated via flow regulator(s) 244 operatively coupled to controller 240, but flow regulator(s) 244 within first line 252 are not operatively coupled to controller 240. In such an example, flow regulator 244 of first line 252 may be a constant flow pump or similar mechanism for providing an unchanging fluid flow but flow regulator 244 of second line 256 may be a variable flow pump or similar adjustable fluid flow mechanism. In other words, this implementation of assembly 200 allows the flow of cooling fluid(s) in second line 256 to be controllable but the flow of cooling fluid(s) in first line 252 is not controllable. Here, controller 240 may adjust the flow of second cooling fluid(s) to control an amount of unsealed cooling fluid(s) extracted from and/or returned to cooling fluid supply 230. In turn, this allows the second cooling fluid(s) to absorb a variable amount of heat from the first cooling fluid(s) in intermediate heat exchanger 254, even where the first cooling fluid flows substantially continuously through generator heat exchanger 250. Here, controller 240 remains operable to actively control the cooling fluid(s) in thermal communication with generator 202 to affect thrust bearing(s) 214 (FIGS. 2, 3), vibrations, and/or other physical properties of assembly 200.

Figure 7:
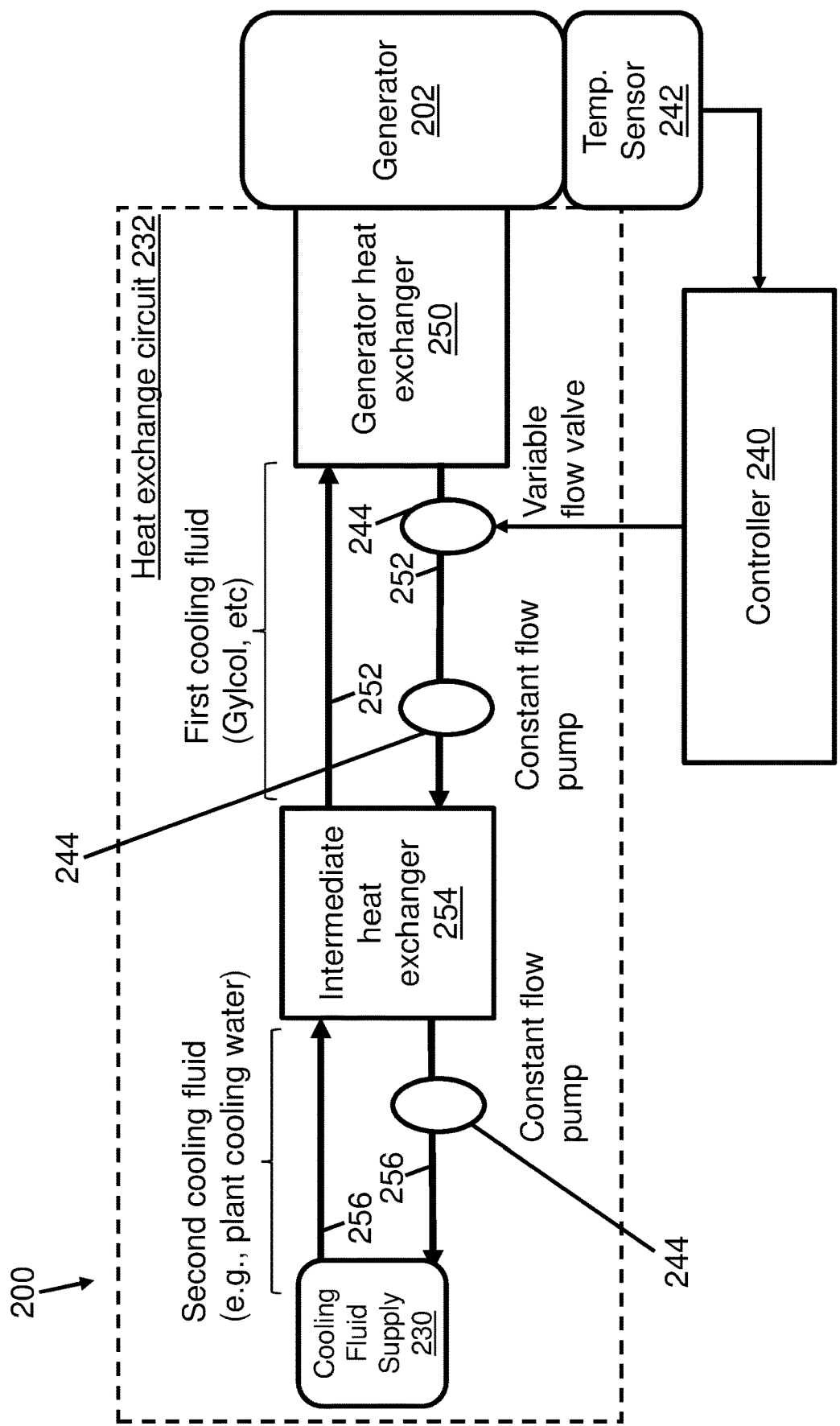
Figure 8:
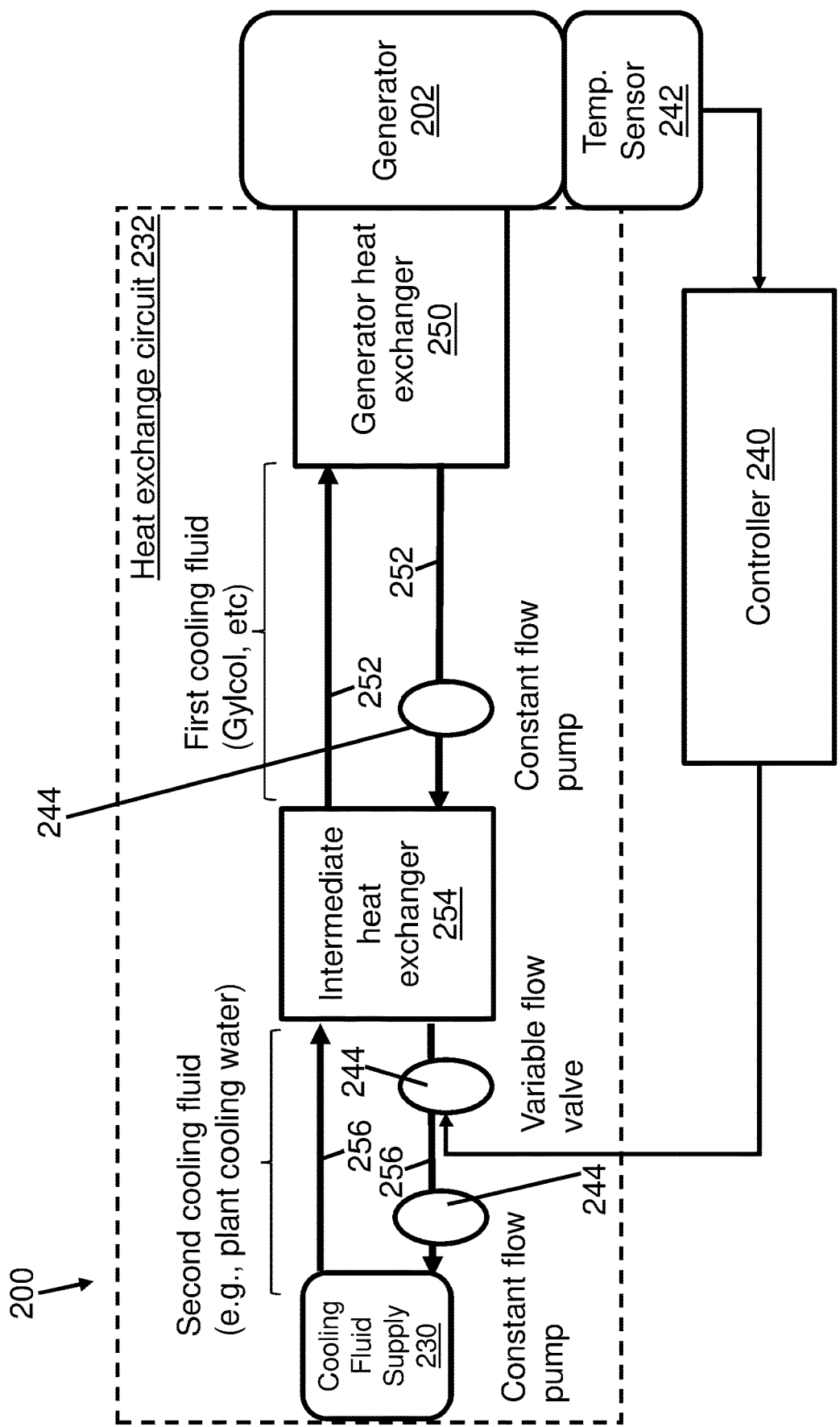
Figure 9:
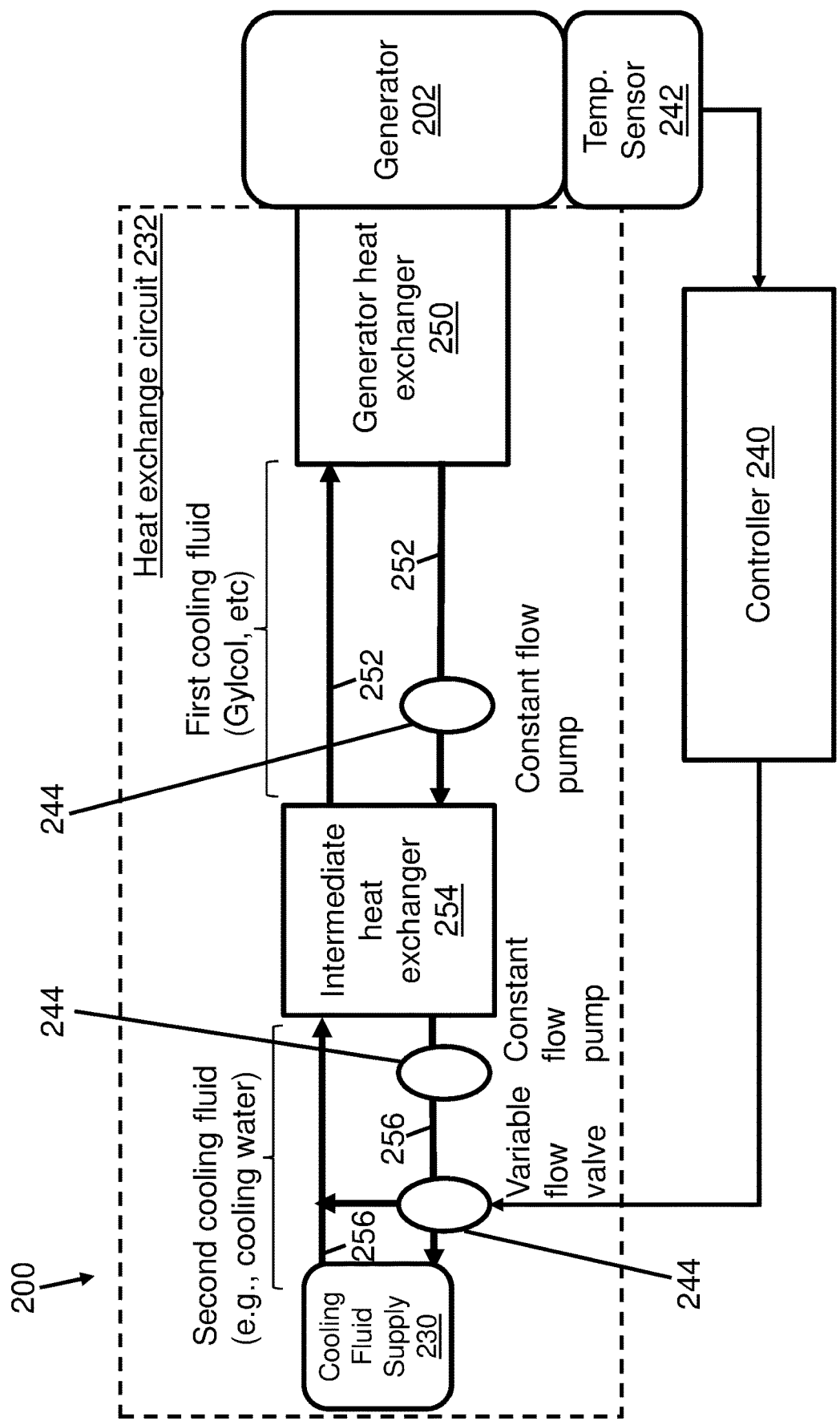

FIGS. 7-9 depict additional examples of assembly 200 and heat exchanger circuits 232 in which first line 252 and second line 256 each include flow regulators 244 in the form of a constant flow pump, e.g., to maintain at least a minimum flow rate of each cooling fluid for heat absorption within generator heat exchanger 250 and intermediate heat exchanger 254. First line 252 may include flow regulator(s) 244 coupled to controller 240 (FIG. 7), and/or second line 256 may include flow regulator(s) 244 coupled to controller 240 (FIGS. 8, 9) for actively controlling the flow of cooling fluid(s) within first line 252 and/or second line 256. Here, flow regulator(s) 244 coupled to controller 240 may include variable flow valves for selectively reducing the flow of cooling fluid(s) in line(s) 252, 256 regardless of the flow provided via pumps elsewhere in the line. Adjustable flow regulator(s) 244 are operable to recirculate, redirect, or otherwise secondarily control the flow rate of cooling fluid(s) in line(s) 256 to influence the cooling fluid temperature(s). In the case of a variable flow valve, flow regulator(s) 244 may be operatively coupled to controller 240 such that controller 240 adjusts the variable flow valve(s) based on a difference between the target temperature of generator 202 and the temperature(s) monitored via temperature sensor(s) 242.

In the examples of FIGS. 7 and 8, the adjustable flow regulator(s) 244 (e.g., the variable flow valves) are operable to adjust the minimum flow rate therethrough, and thus increase or decrease the flow rate of cooling fluid(s) in a return conduit of line(s) 252, 256 (also known as a "return line," "exit conduit," etc.) for providing heated fluid(s) to cooling fluid supply 230 or intermediate heat exchanger 254. In a further alternative shown in FIG. 9, adjustable flow regulator(s) 244 (e.g., a variable flow valve) can divert at least a portion of heated cooling fluid(s) in the return conduit of second line 256 to an entry conduit of second line 256, thereby intermixing with (and heating) lower temperature fluid(s) from cooling fluid supply 230 (i.e., cooling fluid(s) that have not yet exchanged heat with generator 202 and/or another cooling fluid via intermediate heat exchanger 254). Thus, adjustable flow regulator(s) 244 (e.g., variable flow valves) may be used together with non-adjustable flow regulator(s) 244 (e.g., constant flow pumps) to provide at least a minimum amount of cooling in generator 202 while also allowing active temperature control through controller(s) 240.

Figure 10:
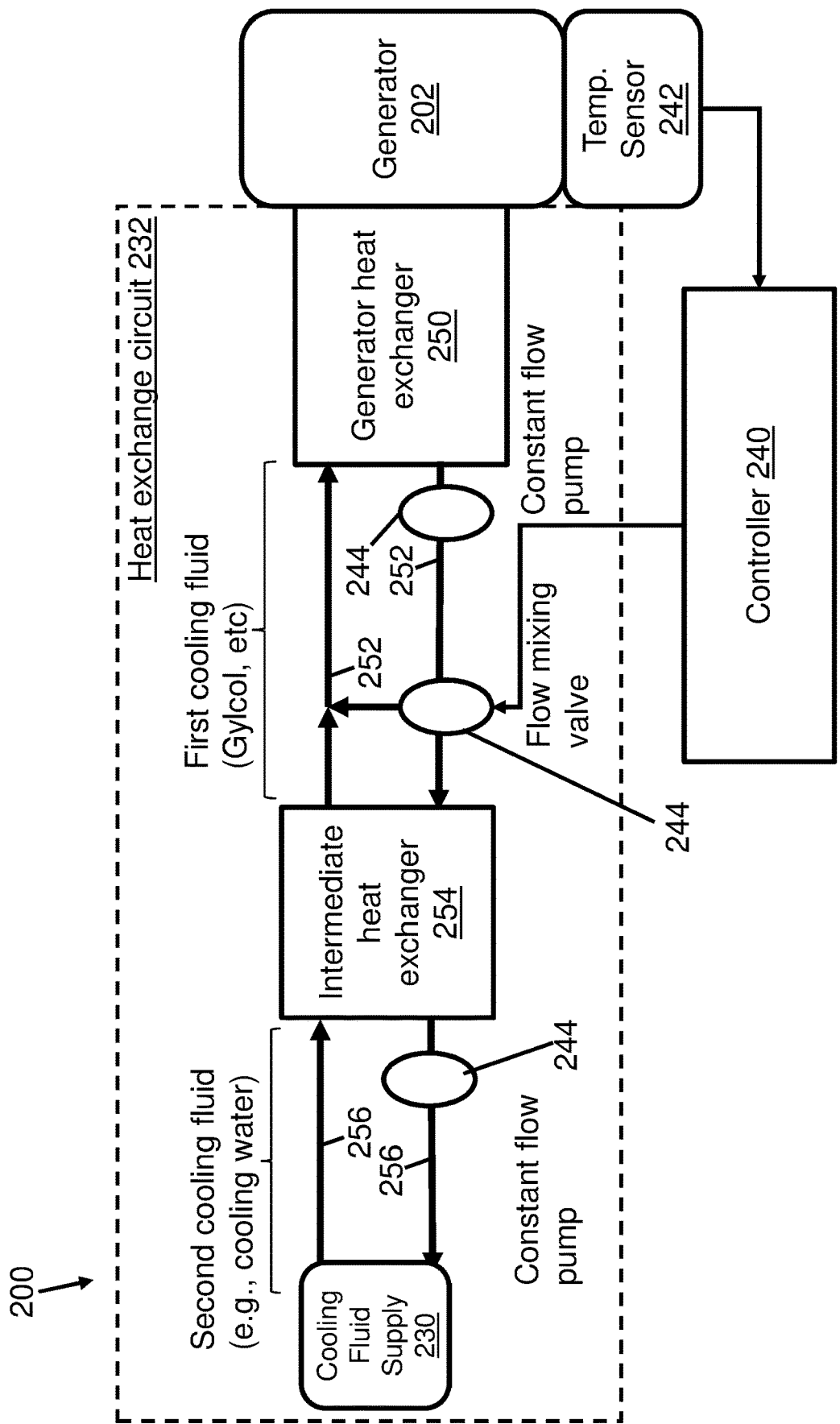

FIG. 10 provides yet another example of assembly 200 in which adjustable flow regulators 244 and non-adjustable flow regulators 244 may be used together to influence the temperature of cooling fluid(s) transmitted to generator heat exchanger 250 via first line(s) 252. As with other implementations, each line 252, 256 may include non-adjustable flow regulators 244 in the form of constant flow pumps so that each line 252, 256 transmits at least a minimum flow of cooling fluid(s) therethrough. In addition, first line 252 may include one or more adjustable flow regulators 244 in the form of a flow mixing valve operatively coupled to controller 240. Flow mixing valve(s) in first line 252 may divert a portion of the heated cooling fluid(s) exiting generator heat exchanger 250 back to an entry conduit of first line 252 before it is cooled in intermediate heat exchanger 254. The diverted fluid(s) intermix with cooled fluid(s) exiting intermediate heat exchanger 254, thus providing a higher temperature cooling fluid to generator heat exchanger 250. Flow regulator(s) 244 in the form of a flow mixing valve are thus operable to mix higher temperature cooling fluids into the cooler temperature fluid(s) that are being transmitted to generator heat exchanger 250. This particular implementation may be suitable to maintain target temperatures in the form of a minimum operating temperature but may be less preferable for cases where lower temperatures (e.g., those less or below the temperature of ambient fluids supplied to heat exchange circuit 232) are desired.

Figure 11:
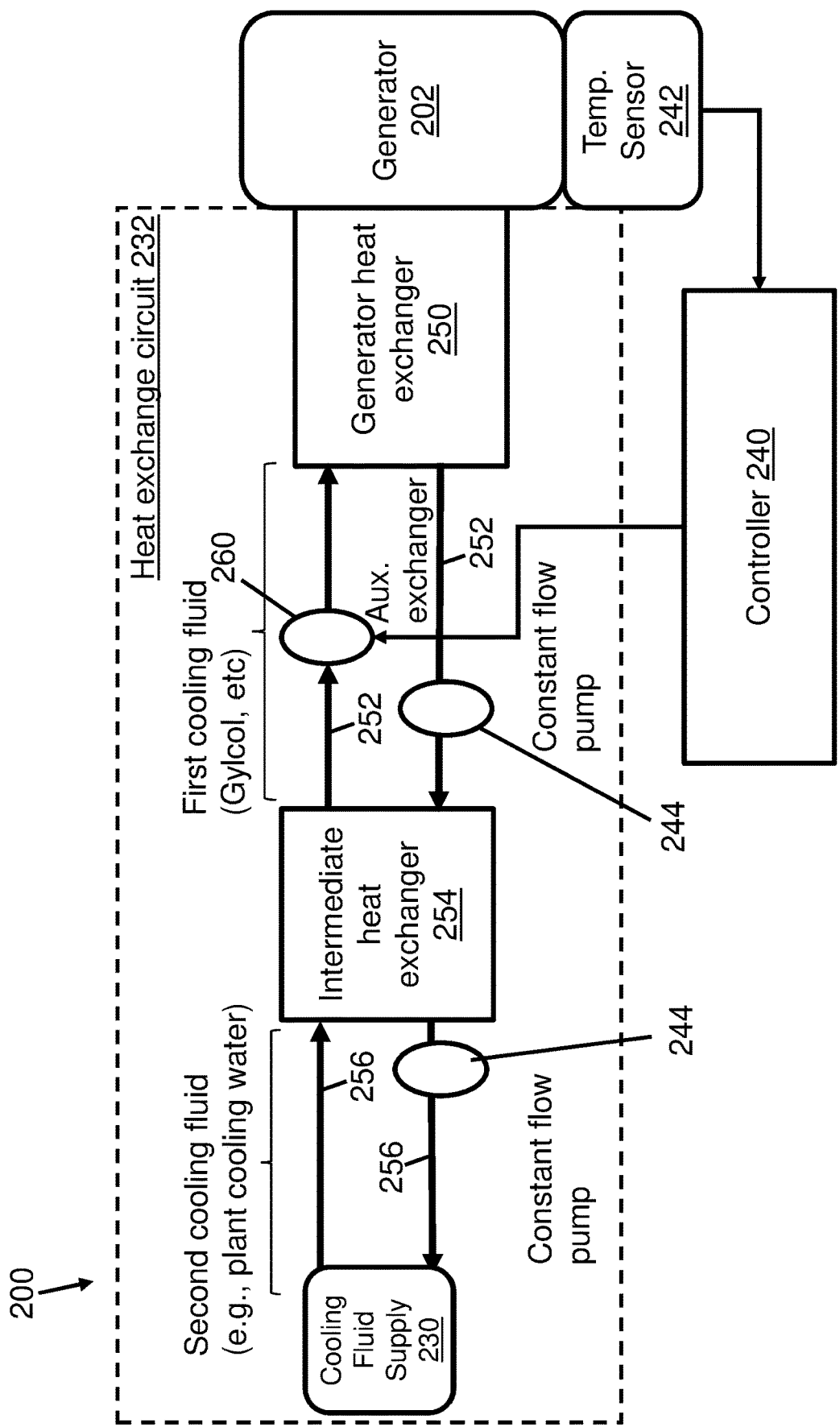

FIG. 11 provides yet another example of assembly 200 in which controller 240 may adjust the temperature of one or more cooling fluids of heat exchange circuit 232 without the aid of flow regulator(s) 244. In this case, first line 252 (additionally or alternatively, second line 256) may include or be in thermal communication with an auxiliary heat exchanger ("aux. exchanger") 260, e.g., another heat exchanger, thermal source, and/or heat sink for altering the temperature of cooling fluid(s) in first line 252. Auxiliary heat exchanger 260 may include, e.g., a low temperature reservoir or high temperature heat source capable of being selectively placed in thermal communication with cooling fluid(s) in first line 252. In other implementations, auxiliary heat exchanger 260 simply may be another heat exchanger carrying another cooling fluid, whether sealed or unsealed. However embodied, auxiliary heat exchanger 260 may be placed in or removed from thermal communication with line(s) 252, 256 via a mechanically adjustable component (e.g., opening or closing a heat-impeding barrier between auxiliary heat exchanger 260 and line(s) 252, 256) to influence the temperature of cooling fluid(s) before it enters generator heat exchanger 250 and/or intermediate heat exchanger 254. Where auxiliary heat exchanger 260 includes a different heat exchange fluid, the amount of heating or cooling may be controlled by changing the fluid(s) therein and/or the temperature of any heat exchange fluid(s) within auxiliary heat exchanger 260. Auxiliary heat exchanger 260 may be particularly suitable for achieving target temperatures that are below the ambient temperature of cooling fluid(s) within cooling fluid supply 230, e.g., water, air, and/or other fluids obtained from the environment where a power train assembly operates may be cooled to less than the ambient temperature via auxiliary heat exchanger 260. Auxiliary heat exchangers 260 also may be particularly helpful for reducing or eliminating higher temperature peaks, i.e., flattening the temperature profile of generator 202 over time. In some cases, the FIG. 11 implementation may selectively (via controller 240) induce step changes in generator 202 temperature to deliberately induce mechanical reactions in generator 202 from a sudden temperature swing.

Figure 12:
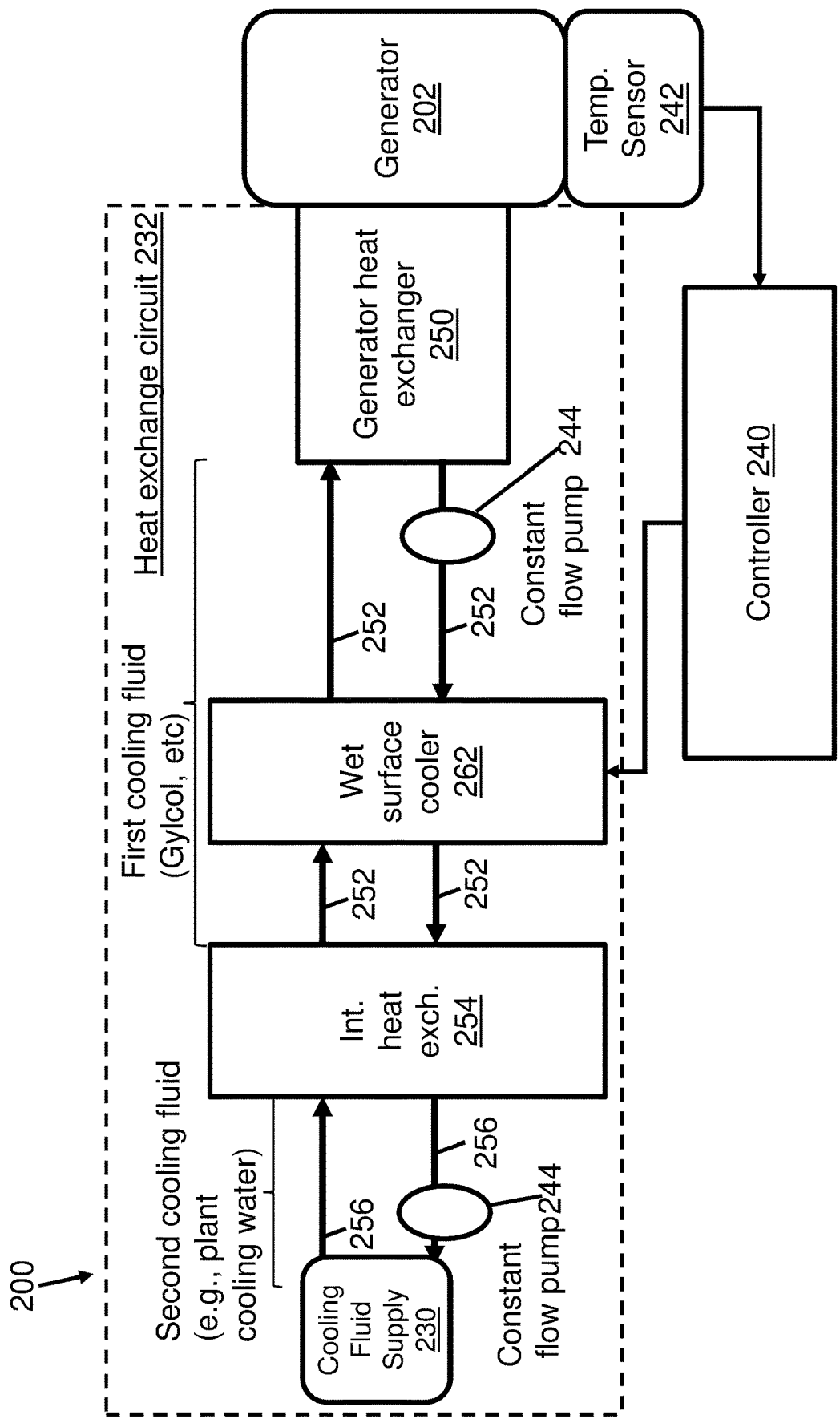

FIG. 12 provides a further example of heat exchange circuit 232 in assembly 200, in which a wet surface cooler 262 (also known as an "evaporative cooler," i.e., a device that cools air through the evaporation of water) is included within heat exchange circuit 232 by being in fluid and/or thermal communication with first line 252. Wet surface cooler 262 may be structured to absorb heat from cooling fluid(s) in first line 252 before or after they are used to cool generator 202 via generator heat exchanger 250. Wet surface cooler 262, similar to implementations that use auxiliary heat exchanger 260 (FIG. 11), may control the temperature of cooling fluid(s) to desired levels, and in particular can lower the cooling fluid temperature(s) below that of cooling fluid supply 230 (e.g., below the temperature of plant cooling water, generator liquids, and/or ambient-based cooling sources). Adjusting the temperature of cooling fluid(s) through wet surface cooler 262 may include, e.g., adjusting one or more fans within wet surface cooler 262 between "on" and "off" states and/or adjusting fan speed, and/or modifying other subcomponents of wet surface cooler 262 or perhaps other components of GT engine 100, generator 202, steam turbine 210, and/or other mechanisms of assembly 200. Wet surface cooler 262 may be particularly desirable for assemblies 200 operating in dry environments, e.g., where cooling fluid supply 230 has a relatively high temperature and/or where other types of cooling are impracticable.

Figure 13:
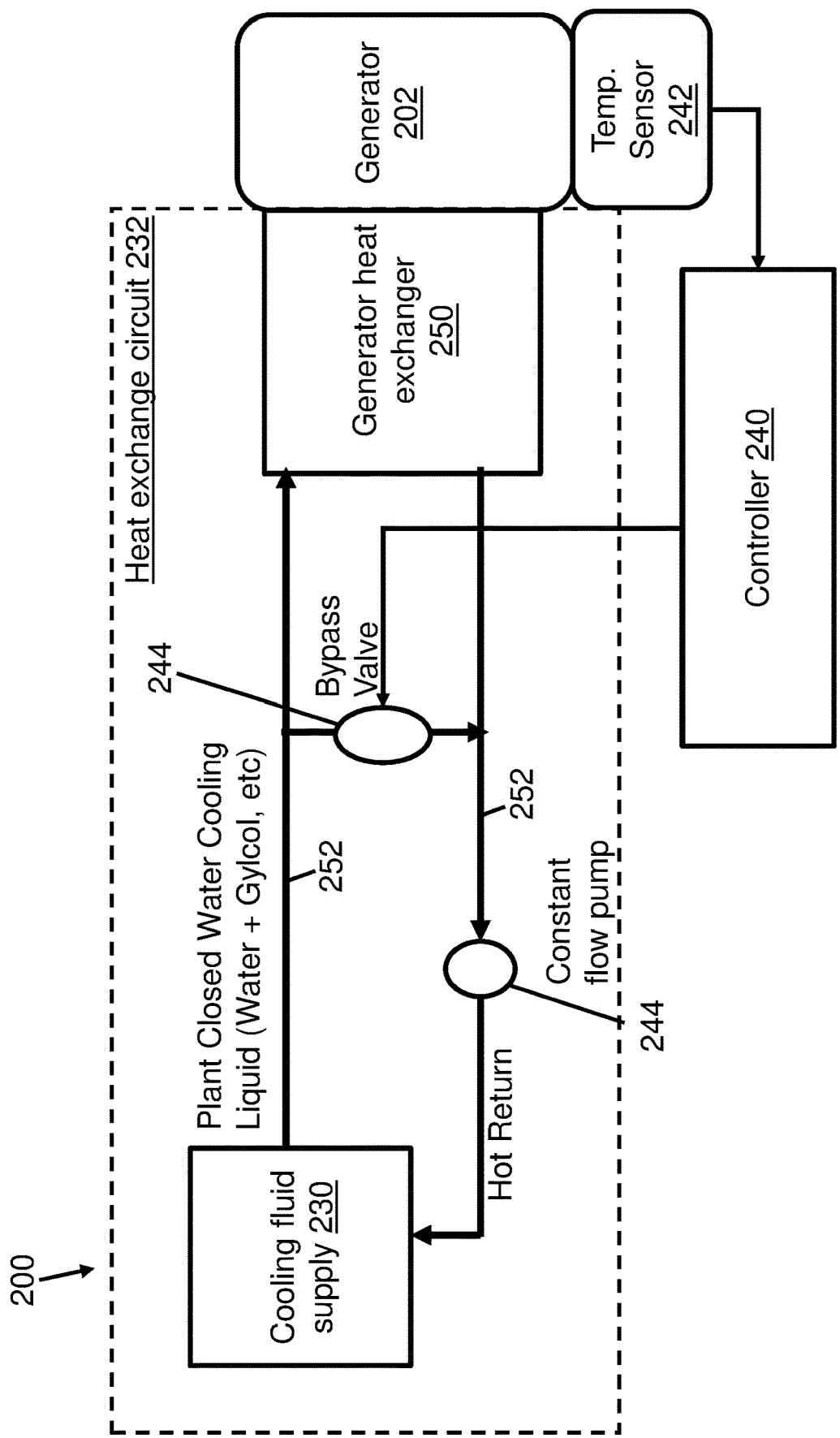

Further embodiments of assembly 200 and heat exchanger circuit 232 are operable for use with only one cooling fluid. FIG. 13, for example, depicts an implementation of assembly 200 operable to control the temperature of generator 202 using only one cooling fluid and/or thermal expansion circuit. FIG. 13 depicts an example where flow regulator 244 in the form of a bypass valve connects a portion of first line 252 delivering cooling fluid to generator heat exchanger to another portion of first line 252 that collects higher temperature cooling fluid from generator heat exchanger 250. Flow regulator 244 in the form of a bypass valve may be coupled to controller 240, enabling active control of how much cooling fluid passes through flow regulator 244. Another flow regulator 244 in the form of a constant flow pump may be within first line 252 to maintain at least a minimum fluid flow between cooling fluid supply 230 (e.g., a plant air cooled heat exchanger) and generator heat exchanger 250. During operation, the bypass valve(s) may divert a portion of cooling fluid from one part of first line 252 to another, bypassing generator heat exchanger 250 and thus preventing heat exchange between the diverted fluid and generator 202. Controller 240 may adjust the position of any bypass valves to control what percentage of cooling fluid bypasses generator heat exchanger 250, and thus not placed in communication with generator 202. A larger percentage of bypassed cooling fluid will maintain a higher temperature in generator 202 and a lower percentage of bypassed cooling fluid will provide more cooling to generator 202. Via this approach, controller 240 may calculate a difference between monitored temperatures from temperature sensor 242 and open or close the bypass valve(s) to affect the temperature of generator 202 via the cooling fluids in first line 252.

Figure 14:
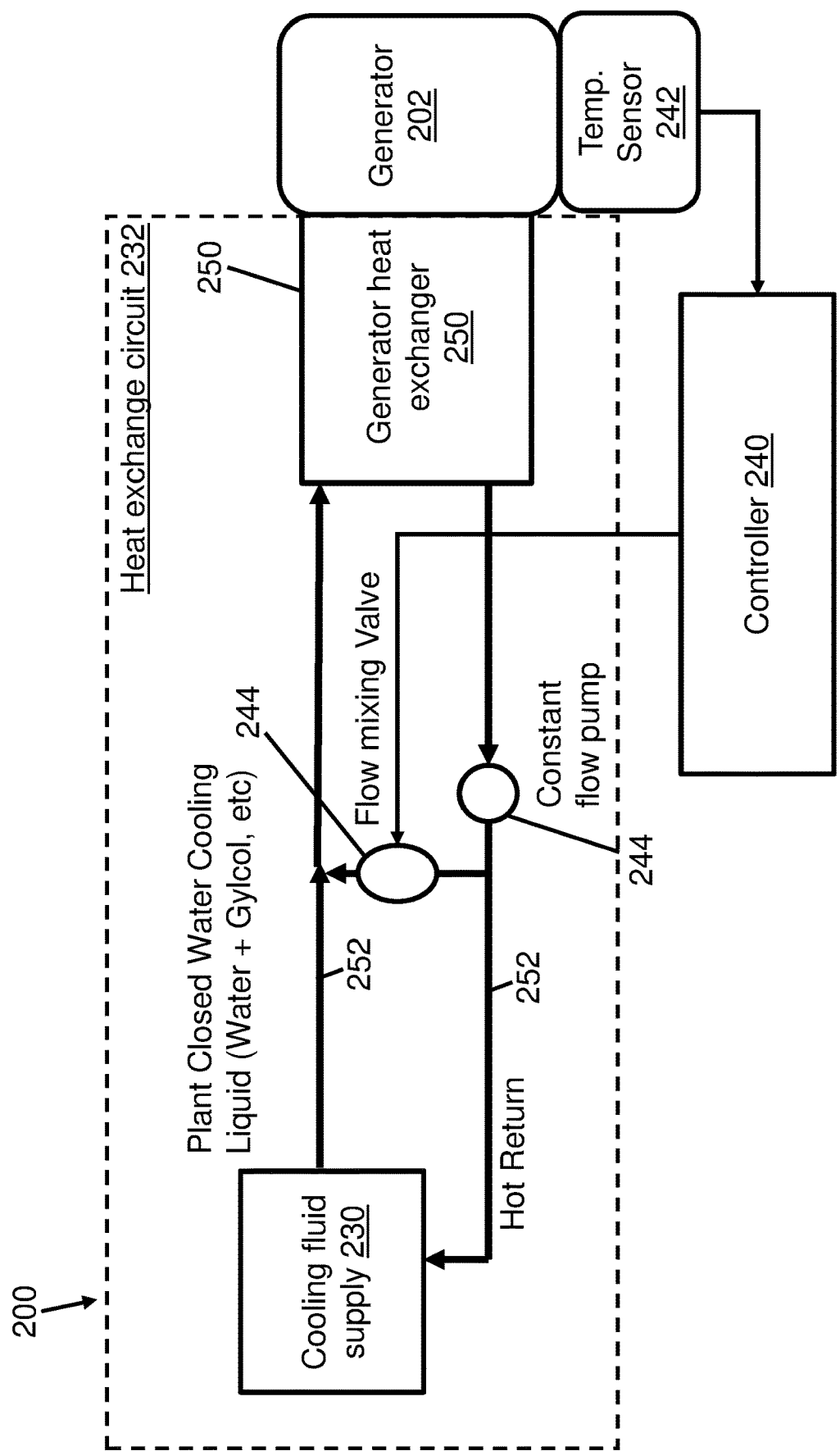

FIG. 14 depicts a further example of assembly 200, similar to the FIG. 13 implementation but in which flow regulator(s) 244 in the form of a flow mixing valve divert cooling fluid(s) back to first line 252 before they return to cooling fluid supply 230. In this case, the flow mixing valve diverts a portion of the heated cooling fluid exiting generator heat exchanger 250 back to portions of line 252 where cooling fluid has not yet entered generator heat exchanger 250. Controller 240 may be operatively coupled to the flow mixing valve, allowing an operator of assembly 200 to intentionally raise the temperature of cooling fluid before it reaches generator heat exchanger 250. Flow regulator(s) 244 in the form of a flow mixing valve may be located downstream of other, non-controllable flow regulators (e.g., a constant flow pump) in first line 252. Controller 240 may operate by adjusting the percentage of cooling fluid that is recirculated back into generator heat exchanger 250 via the flow mixing valve(s). As with other implementations, controller 240 may be coupled to temperature sensor(s) 242 for monitoring the temperature in generator 202 and adjusts the flow mixing valve(s) to achieve a target thrust bearing load, vibration parameter, and/or other desired mechanical state within assembly 200.

Figure 15:
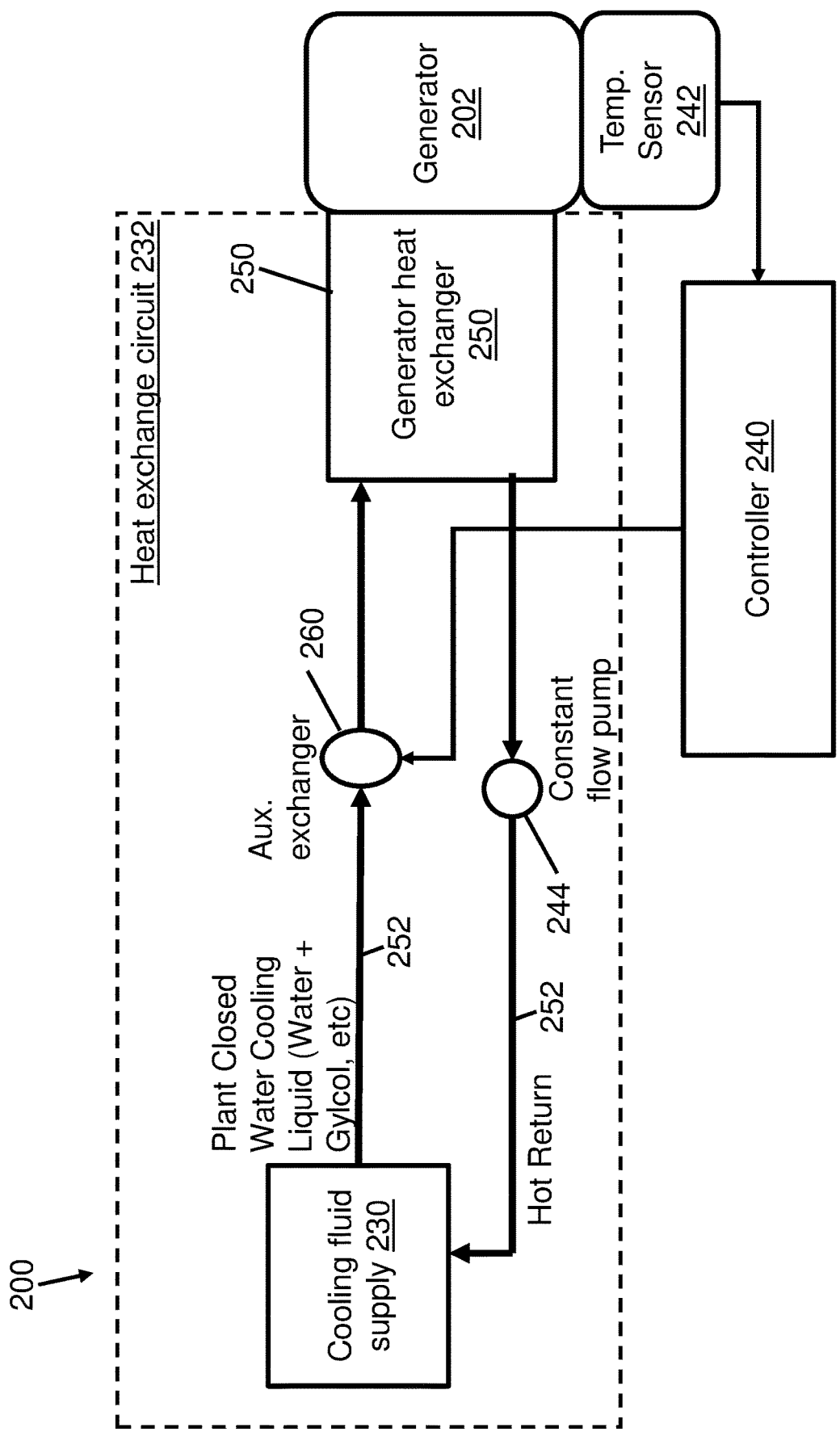

FIG. 15 illustrates a further embodiment of assembly 200 in which the temperature of cooling fluid(s) in first line 252 is controlled without flow regulator(s) 244. Here, auxiliary heat exchanger 260 may be in thermal and/or fluid communication with first line 252. Although auxiliary heat exchanger 260 in particular is shown as being coupled to a portion of first line 252 for transmitting cooling fluid(s) to generator heat exchanger 250, auxiliary heat exchanger can additionally or alternatively be coupled to portions of first line 252 that are downstream of generator heat exchanger 250. Thus, the embodiment of assembly 200 shown in FIG. 15 is similar to that of FIG. 11 discussed elsewhere herein, i.e., controller 240 may adjust auxiliary heat exchanger 260 to reduce the temperature of cooling fluid(s) in first line 252 below that of cooling fluid supply 230 or raise the temperature of cooling fluid(s) above that of cooling fluid supply 230. Controller 240 may be in communication with temperature sensor 242 to monitor temperatures within generator 202 and may control an amount of heating or cooling provided via auxiliary heat exchanger 260, e.g., by increasing or reducing an amount of auxiliary heat exchange fluid in thermal communication with the incoming cooling fluid, selectively bringing auxiliary heat exchanger 260 into or out of thermal communication with first line 252 as discussed in other examples, etc. In this scenario, cooling fluid in first line 252 does not necessarily need to be recirculated into other portions of first line 252. However, it is emphasized that each of the various implementations discussed herein may be combined or modified as desired to control the temperature of generator 202 within a particular range and/or to suit various deployment settings.

Although FIGS. 5-15 provide several example components for actively controlling the temperature of cooling fluid(s) in heat exchange circuit 232, it is understood that controller 240 may influence the temperature of cooling fluid(s) and generator 202 via any currently known or later developed mechanism or combination of mechanisms for changing the temperature of a cooling fluid. It is, moreover, understood that any or all of the various embodiments described herein may be used together in any conceivable combination for more precise and robust control of cooling fluid temperatures to suit a wide variety of operating environments and/or situational demands.

Embodiments of the disclosure provide various technical and commercial advantages, examples of which are discussed herein. Embodiments of the disclosure may be particularly helpful for managing the temperature, mechanical stresses, and thermal expansion of assembly 200 and/or other power train systems that rely on only a single shaft, e.g., shaft 111 for a power plant having GT engine 100 (FIGS. 2, 3) and steam turbine 210 each mounted on shaft 111. Embodiments of the disclosure also may benefit the operation of multi-shaft power train assemblies with few or no modifications from the various examples discussed herein. Actively controlling the temperature of generator 202 by cooling fluid management and with reference to thrust bearing 214 parameters, vibration of assembly 200, and/or other mechanical parameters may provide mechanical benefits such as, e.g., reducing the axial expansion of shaft 111 and/or loads on clutch(es) 212 and thrust bearing(s) 214 as they operate. Further benefits may include, e.g., reduced variation in axial loading over different types of operating conditions, reduced occurrence of clutch 212 slipping, and reduced variation in where the axial end(s) of shaft 111 are located within assembly 200 (i.e., distance of axial end of shaft 111 relative to thrust bearing(s) 214). In turn, the teachings of the disclosure may reduce uncertainty in the position of any components, equipment, etc., driven by shaft 111 (e.g., monitoring strips, indicating wheels, interface points such as collector rings, fans, seals, etc.). Embodiments of the disclosure furthermore increase the ability for controller 240 and/or interconnected control systems (e.g., plant management software) to respond to changing conditions and/or other variables that otherwise would be difficult or impossible to control via other adjustable components.

The apparatus and devices of the present disclosure are not limited to any one particular turbomachine, engine, turbine, jet engine, power generation system or other system, and may be used with other turbomachines such as aircraft systems, power generation systems and/or related systems (e.g., combined cycle, simple cycle, nuclear reactor, etc.). Additionally, the apparatus of the present disclosure may be used with other systems not described herein that may benefit from the increased efficiency of the apparatus and devices described herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

We claim:
1. An apparatus comprising:
a temperature sensor configured to monitor a temperature of a generator component of a power train assembly, wherein the power train assembly includes a power train component in thermal communication with a cooling fluid and mounted on a same shaft as the generator component; and a controller coupled to the temperature sensor and a heat exchange circuit for adjusting a temperature of the cooling fluid, wherein the controller is configured to:
calculate a target temperature for the generator component based on a target thrust bearing parameter or a target vibration parameter for the power train assembly, and
adjust a delivery of the cooling fluid to the power train component based on a difference between the monitored temperature and the target temperature.

2. The apparatus of claim 1, wherein the controller is configured to adjust the delivery of the cooling fluid by increasing or reducing an amount of cooling fluid provided to or extracted from the generator component via a variable flow pump.

3. The apparatus of claim 1, wherein the controller is configured to adjust the delivery of the cooling fluid by increasing or reducing an amount of cooling fluid transmitted from a return conduit to an entry conduit via a variable flow valve.

4. The apparatus of claim 1, wherein the controller is configured to adjust the delivery of the cooling fluid by adjusting a mixing valve for diverting a portion of the cooling fluid exiting the heat exchange circuit into the generator component.

5. The apparatus of claim 1, wherein the controller is configured to adjust the delivery of the cooling fluid by adjusting a temperature of a wet surface cooler within the heat exchange circuit.

6. The apparatus of claim 1, wherein the controller is configured to adjust the delivery of the cooling fluid via an auxiliary heat exchanger within the heat exchange circuit.

7. The apparatus of claim 1, wherein the controller is further configured to calculate the target temperature based on a target axial length or a target thermal expansion of the shaft.

8. A system comprising:
a power train assembly having a generator component and a power train component mounted on a same shaft;
a temperature sensor configured to monitor a temperature of the generator component;
a heat exchange circuit in thermal communication with the generator component, wherein the heat exchange circuit is configured to cool the generator component with a cooling fluid; and
a controller coupled to the temperature sensor and the heat exchange circuit, wherein the controller is configured to:
calculate a target temperature for the generator component based on a target thrust bearing parameter or a target vibration parameter for the power train assembly, and
adjust a delivery of the cooling fluid to the power train component based on a difference between the monitored temperature and the target temperature.

9. The system of claim 8, wherein the controller is configured to adjust the delivery of the cooling fluid by increasing or reducing an amount of cooling fluid provided to or extracted from the generator component via a variable flow pump.

10. The system of claim 8, wherein the controller is configured to adjust the delivery of the cooling fluid by increasing or reducing an amount of cooling fluid transmitted from a return conduit to an entry conduit via a variable flow valve.

11. The system of claim 8, wherein the controller is configured to adjust the delivery of the cooling fluid by adjusting a mixing valve for diverting a portion of the cooling fluid exiting the heat exchange circuit into the generator component.

12. The system of claim 8, wherein the controller is configured to adjust the delivery of the cooling fluid by adjusting a temperature of a wet surface cooler within the heat exchange circuit.

13. The system of claim 8, wherein the controller is configured to adjust the delivery of the cooling fluid via an auxiliary heat exchanger within the heat exchange circuit.

14. The system of claim 8, wherein the controller is further configured to calculate the target temperature based on a target axial length or a target thermal expansion of the shaft.

15. A method comprising:
monitoring a temperature of a generator component of a power train assembly, wherein the power train assembly includes a power train component in thermal communication with a cooling fluid of a heat exchange circuit and mounted on a same shaft as the generator component;
calculating a target temperature for the generator component based on a target thrust bearing parameter or a target vibration parameter for the power train assembly; and
adjusting a delivery of the cooling fluid to the power train component based on a difference between the monitored temperature and the target temperature.

16. The method of claim 15, wherein adjusting the delivery of the cooling fluid includes increasing or reducing an amount of cooling fluid provided to or extracted from the generator component via a variable flow pump.

17. The method of claim 15, wherein adjusting the delivery of the cooling fluid includes reducing an amount of cooling fluid transmitted from a return conduit to an entry conduit via a variable flow valve.

18. The method of claim 15, wherein adjusting the delivery of the cooling fluid includes adjusting a mixing valve for diverting a portion of the cooling fluid exiting the heat exchange circuit into the generator component.

19. The method of claim 15, wherein adjusting the delivery of the cooling fluid includes adjusting a temperature of the cooling fluid via a wet surface cooler or an auxiliary heat exchanger within the heat exchange circuit.

20. The method of claim 15, wherein the calculating of the target temperature is based on a target axial length or a target thermal expansion of the shaft.

* * * * *